Sept. 15, 1953 — H. J. SHAFER — 2,652,033
PRESSURE FLUID ACTUATED VALVE OPERATING MECHANISM
Filed Aug. 25, 1947 — 2 Sheets-Sheet 1

INVENTOR:
HOMER J. SHAFER
BY Alfred F. Rees
ATTORNEY.

Sept. 15, 1953  H. J. SHAFER  2,652,033
PRESSURE FLUID ACTUATED VALVE OPERATING MECHANISM
Filed Aug. 25, 1947  2 Sheets-Sheet 2

INVENTOR:
HOMER J. SHAFER
BY Alfred F. Dees
ATTORNEY.

Patented Sept. 15, 1953

2,652,033

UNITED STATES PATENT OFFICE 2,652,033

PRESSURE FLUID ACTUATED VALVE OPERATING MECHANISM

Homer J. Shafer, Mansfield, Ohio, assignor to The Shafer Valve Co., Mansfield, Ohio, a corporation of Ohio Application August 25, 1947, Serial No. 770,430

3 Claims. (Cl. 121—38)

This invention relates to valves for controlling the flow of pressure fluid in transcontinental gas or oil pipe lines or in any other high pressure pipe line installation and one of the objects of the invention is to provide a normally open valve that it completely pressure fluid operated, whose operation is accomplished by the balancing and unbalancing of pipe line pressures against each other through the primary pressure fluid motor so that a small secondary pressure fluid motor closes the valve by bringing the movable member thereof into engagement with the valve seat.

Another object of the invention is to provide a valve built to operate as above which is simple and compact in construction and which is efficient in operation.

Another object of the invention is to provide a structure of such shape and proportions that when hot operating fluids are passed, some of which are withdrawn therefrom to operate the valve motors, will have cooled sufficiently before being introduced into the motors so as not to adversely affect their operating characteristics.

A further object of the invention is to provide operating mechanism for a high pressure valve that will be interchangeable with that of other valves regardless of their pressure rating.

A still further object of the invention is to provide an operating system for a valve for transmitting and controlling the passage of high pressure fluids a control therefor that is employable for throttling the valve as well as permitting a quick repair thereof without necessarily disabling the entire valve.

Other and further objects of the invention will occur to those skilled in the arts to which it pertains as the description proceeds which taken in connection with the accompanying drawing sets forth a preferred embodiment of the invention which is not to be construed as a limitation thereof and which is limited only by the appended claims and any and all modifications, alterations and variations of structure coming within the spirit and scope thereof are deemed to be included herein.

Figure 1:
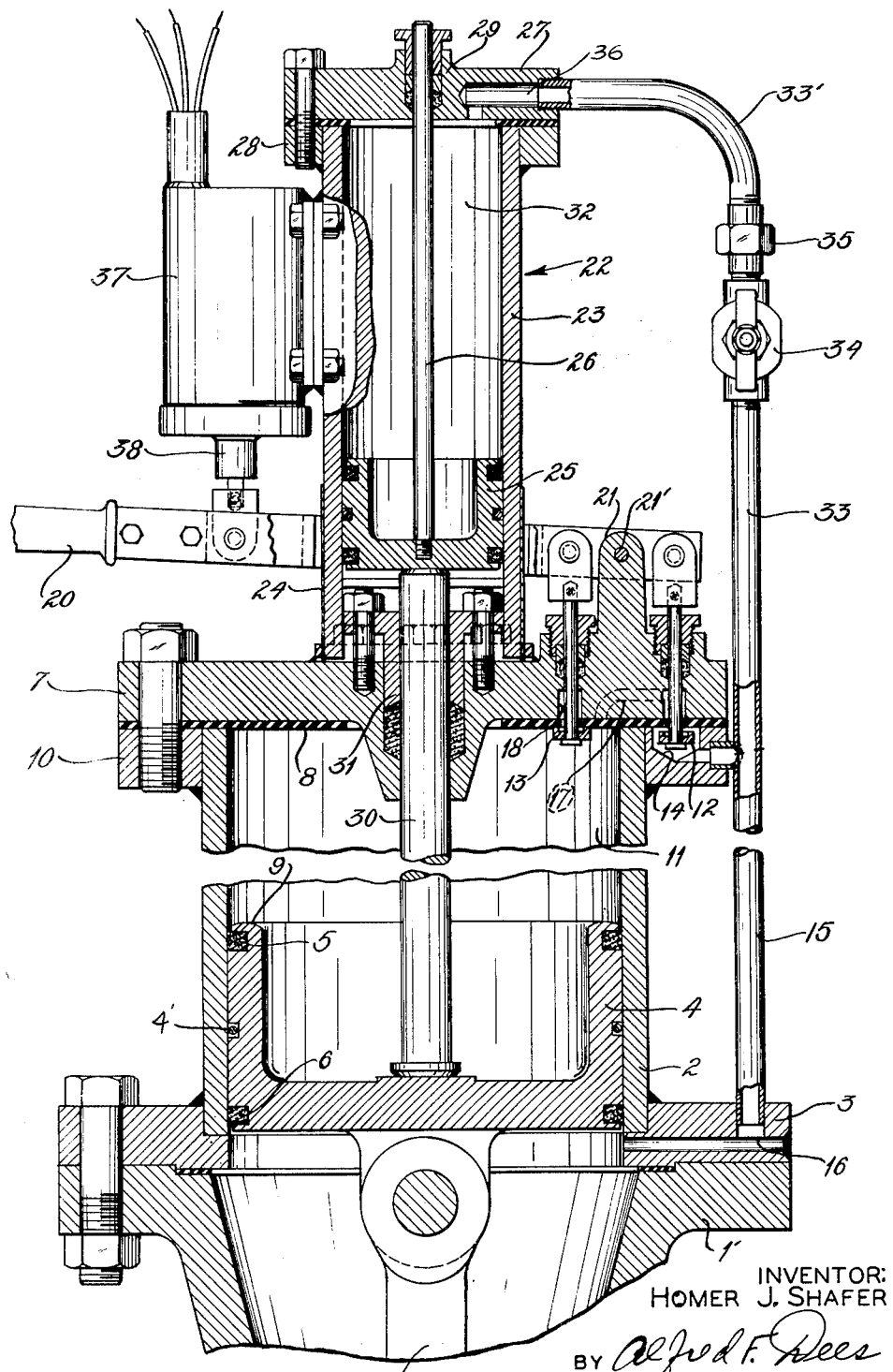
Fig. 1 shows a vertical section view of a valve embodying the invention and taken substantially along the line 1—1 of Fig. 2.
Figure 2:
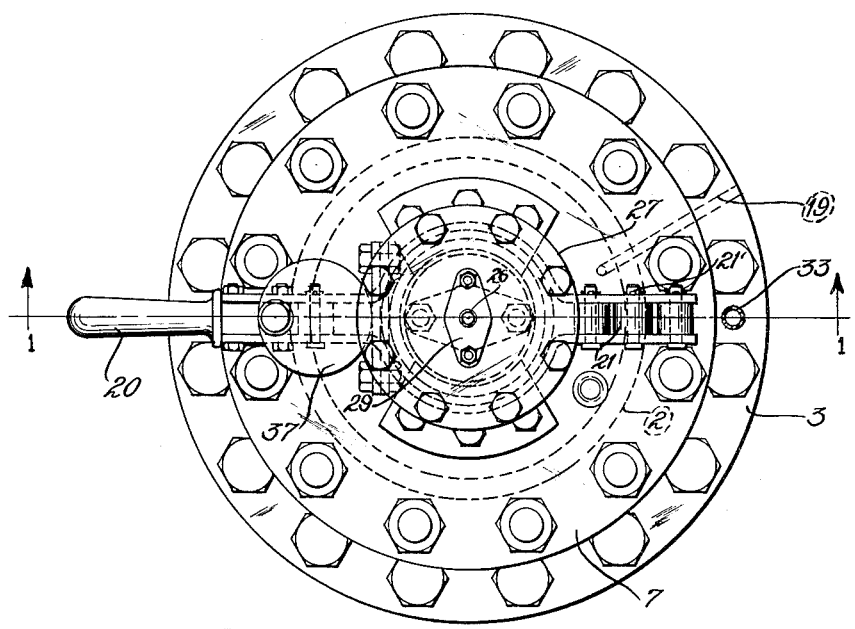
Fig. 2 shows a plan view thereof with a portion removed to show detail.
Figure 3:
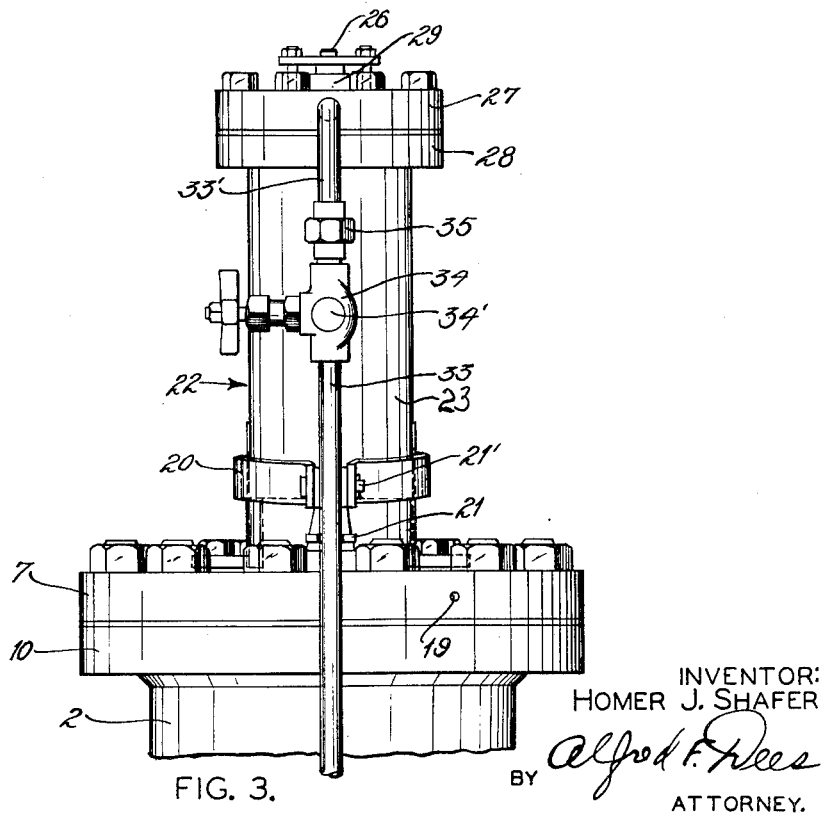
Fig. 3 shows a side elevational view of the upper end of the valve assembly.

This invention is an improvement over that described in copending application S. N. 673,787 filed June 1, 1946, now Patent No. 2,612,906 and entitled Valve. The structure set forth in said application calls for the pressure in the pipe line in which said valve is connected to open the valve under certain conditions and under certain other conditions a spring will close the valve. The primary operating motor has the pipe line pressure constantly present in one end of its cylinder so that one end of the piston therein is constantly subjected to the fluid pressure in the pipe line. When the valve is closed the pressure fluid from the high pressure line or side of the valve forces the movable element of the valve against the valve seat on the low pressure side of the valve, the pressure fluid passing through a small clearance provided between the movable valve element and the seat on the high pressure side, thereby acting on the movable element to firmly seat it on the seat on the low pressure side.

A main valve structure or body similar to that in said copending application is employed in this disclosure in which the operating mechanism for the movement of the movable valve member (not shown) secured to the rod 1 which is fastened to piston 4, comprises a cylinder 2 provided with a flange 3 which is secured to the body 1' of the valve, only a portion of which is shown.

The piston 4 is slidably mounted in the cylinder 2 and its lower end is always being acted upon by pressure fluid derived from the high pressure side of the pipe line or conduit in which the valve is connected. The piston 4 is shouldered at its ends so that there is clearance provided between it and the walls of the cylinder. A pair of felt wipers or washers 5 and 6 are arranged in suitable grooves cut into the shouldered portions of the piston. These washers prevent grit or other foreign matter getting in between the cylinder wall and the piston. A suitable packing or sealing ring, which is preferably an O ring 4', is disposed in a groove midway the length of the piston, as illustrated, for the purpose of preventing the excessive leakage of pressure fluid between cylinder and piston. When the valve is handling high temperature fluids the wipers are replaced by compression rings and the O ring may or may not be used depending upon the temperature of the fluid.

A closure or cylinder head 7 is removably secured to a flange 10 welded to the upper end of the cylinder and a rubber like gasket material 3 is disposed between the head and the flange to prevent pressure fluid leakage. This material extends over the entire face of the head 7 and acts as a valve seat in conjunction with the rounded end 9 of the skirt on the piston 4. When the piston is in its uppermost position the rounded end 9 of the piston skirt engages gasket material 8 to check the flow of any pressure fluid passing the O ring and in cooperation therewith makes the entire valve virtually leak proof. The greater the pressure acting on the lower end of the piston 4 by line pressure the more firmly end 9 will seat on or engage with the gasket material 8.

The flow of pressure fluid present in the valve body 1' to the upper end of the cylinder or to the chamber 11 is controlled by a poppet valve 12 and its exhaust therefrom is controlled by poppet valve 13 both of which valves seat on gasket material 8. Communication is established between the interior of body 1' and the valve chamber 14 in flange 10 through duct 16 and conduit 15, one end of the latter fitting into duct 16 and its other end fitting into a short suitable duct in flange 10 connected to chamber 14. A duct 17 formed in head 7 establishes communication between the valve chamber 14 and the chamber 11 in cylinder 2. Another chamber 18 is formed in the head 7 through which the stem of poppet valve 13 extends, and a duct 19 formed in the head 7 establishes communication between the chamber 14 and the atmosphere.

The valves are opened and closed in a timed sequence by lever 20 which is pivotally supported on a pin 21' arranged in bracket or boss 21 formed on the head 7. The stems of each of the poppet valves extend through the head 7 through suitable stuffing boxes arranged in the head 7 and are then pivotally connected to the lever 20 on opposite sides of the bracket 21, suitable linkage being arranged between the ends of the valve stems and the lever 20. Some lost motion is preferably provided between the pivot pins connecting the valve stems to the lever 20 so that the valve stem motion will be vertical, as viewed in the drawings. One of the valves will always be closed and the other open whenever the lever 20 is rotated about pin 21' to the extreme limits of its travel. When this lever motion is performed pressure fluid will be introduced into or exhausted from the cylinder chamber 11, depending the direction of rotation of the lever 20 about its pivot pin 21'.

The piston 4 is moved to its lowermost position, as viewed in the drawings, by a pressure fluid device 22 supported on head 7. This motor comprises a cylinder 23 supported on the head 7 by a suitable standard 24, appropriate securing means being employed to produce a rigid structure. A piston 25 is slidably mounted in the cylinder 23 whose construction is identical with that of piston 4 as to shoulders, wiper rings and O ring. All of this structure is essential to prevent leakage past piston 25. In the event hot fluids are handled it is preferred to retain the rubber like O ring because by reason of the spacing of the cylinder 25 from the valve body the fluid will probably have cooled sufficiently to prevent damage to the O ring.

A piston rod 26 is secured to the piston 25 and extends through cylinder head 27 removably secured to the cylinder flange 28. A suitable gasket is disposed between the head 27 and the cylinder flange 28 to prevent leakage of pressure fluid. The piston rod extends through and is slidably received in a stuffing box 29 arranged on the head 27. The rod 26 may under some circumstances be eliminated. It does however, constitute a means to manually move the pistons 4 and 25 to close the main valve in the event there should be a pressure fluid failure when the main valve is open. The rod also constitutes a convenient means of telling when the main valve is open or closed, it being open when the rod extends from the cylinder 23.

Simultaneous movement of the pistons 4 and 25 is accomplished by means of rod 30 that is received in and is slidable in a stuffing box 31 arranged on the head 7. This rod is not connected to either piston and is contactable only with one of the end faces of each piston as illustrated.

Pressure fluid is conducted from the conduit 15 to the chamber 32 in cylinder 23 through a conduit 33, through a shut off valve 34, union 35 and conduit 33' to the chamber 36 formed in the head 27 and thence through the chamber port into the cylinder chamber 32.

The lever 20 is divided into two parts through its center to enable it to surround the standard 24. The lever can be rotated about its pivot pin 21' manually but it is preferred to do it by means of a double solenoid 37 such as shown in the above identified application. The plunger or armature for the solenoid is suitably connected to the lever 20 by means of an appropriate linkage 38 that is provided with a certain amount of lost motion between the two. The two solenoids are connected to a suitable control switch (not shown) which may be remotely positioned from the valve. The solenoid is rigidly secured to the cylinder 23 in a manner so that the piston 25 may freely move therein.

The operation of the valve is as follows: Assume that the lever 20 is in its uppermost position with the main valve closed and that it is desired to open it. The lever now is pushed down or rotated counterclockwise which action opens the exhaust valve 13 and closes the inlet valve 12. Pressure fluid will now be exhausted from the chamber 11 to the atmosphere through duct 19. Before this can happen pressure fluid must be exhausted from chamber 32 which is accomplished by operating valve 34 so that it shuts off the flow of pressure fluid from conduit 15 to simultaneously exhaust pressure fluid in chamber 32 to atmosphere through port 34'. When the two chambers are exhausting, pressure fluid acting on the lower end of piston 4 will move it upwardly, then the main valve will open that is in body 1' and both pistons 4 and 25 will be in their uppermost position. The rounded end 9 on the skirt of piston 4 will engage gasket 8 and assist the O in piston 4 in preventing the escape of pressure fluid from cylinder 2 past piston 4. Assume that it is desired to close the main valve in body 1'. Lever 20 is now moved to the position illustrated in Fig. 1 thereby closing valve 13 and opening valve 12. This motion or action will subject both ends of piston 4 to main line pressure. Valve 34 is now adjusted so that main line pressure will flow to chamber 32. Since both ends of piston 4 are subjected to equal pressures the only force that motor 22 must exert is that necessary to overcome the friction between cylinder 2 and piston 4 and the friction in stuffing box 31. Pressure fluid motor 22 may be employed on any valve regardless of its pressure because the only work it does is to open the main valve and overcome the two sources of friction. The motor 22 may be quickly disassembled and assembled on head 7 without in any manner disturbing the main valve. This feature facilitates repair and adjustment of motor 22 or any of its associated parts.

That which is believed new, novel and useful and which is sought to be protected by Letters Patent of the United States of America is as follows:

I claim:

1. A pressure fluid actuated operator for a valve comprising a first cylinder; a first piston in said cylinder, one side of which is constantly subjected to pressure; a head for said cylinder; a second cylinder mounted on said head; a second piston in said second cylinder; a piston rod for the piston in said first cylinder that extends through said head and is engageable with the second piston in said second cylinder; a head for said second cylinder; a rod for the second piston in said second cylinder extending through the head therefor for manually moving the second piston and for indicating the position of said first piston; a pressure supply pipe; a valve in the first mentioned cylinder head for applying pressure to the other side of the first piston in said first mentioned cylinder and for controlling the release of pressure from the other side of the first piston in said first cylinder; and a three way valve in said supply pipe for controlling the application and release of pressure from one side of the second piston in said second cylinder, the second piston moving the first piston in said first cylinder when pressure is substantially equalized on both sides of the first piston in said first cylinder.

2. A pressure fluid actuated operator for a valve comprising a first cylinder; a first piston in said first cylinder one end of which is constantly subjected to pressure fluid; a head for said first cylinder and in combination with said head forming a chamber in said first cylinder; means in said head for controlling the admission of pressure fluid to said chamber to thereby substantially balance the pressures acting on the first piston; means in said head for controlling the exhaust of pressure fluid from said chamber; means mounted on said head for simultaneously actuating said admitting and exhausting means; a second cylinder mounted on said head; a second piston in said second cylinder; a rod slidably received in said head and connected to the first piston in said first cylinder and engageable with the second piston in said second cylinder; a head for said second cylinder; means for applying pressure fluid to the second piston in said second cylinder for moving same, said second piston moving the first piston in said first cylinder through said rod when the pressures on each end of the first piston in said first cylinder are equal, the first piston in said first cylinder moving the second piston in said second cylinder when said chamber has been exhausted of pressure fluid by the pressure applied constantly to one end of said first piston; and means associated with said last mentioned means for exhausting pressure fluid from said second cylinder.

3. A pressure fluid actuated operator for a valve comprising a first cylinder; a first piston in said first cylinder one end of which is constantly subjected to pressure fluid; a head for said first cylinder in combination with said first piston forming a chamber therein; means in said head for controlling the flow of pressure fluid into said chamber; means in said head for controlling the exhaust of pressure fluid from said chamber; a lever mounted on said head for actuating both of said means; a reversible solenoid for actuating said lever; a second pressure fluid cylinder provided with a second piston mounted on said head; means operatively associating said pistons so that one may be moved by the other and being disposed between said pistons; and means for controlling the operation of said second piston so that it may move the first piston in said first cylinder when said chamber is filled with pressure fluid equal to the pressure applied to the other end of said first piston, said first piston in said cylinder moving the second piston in said second cylinder when pressure fluid is exhausted from the chamber and pressure fluid is exhausted from said cylinder mounted on said head.

HOMER J. SHAFER.

References Cited in the file of this patent

UNITED STATES PATENTS

| Number | Name | Date |
|---|---|---|
| 354,014 | Easton | Dec. 7, 1886 |
| 772,842 | Spencer et al. | Oct. 18, 1904 |
| 926,400 | Freaney | June 29, 1909 |
| 1,051,768 | Rumold | Jan. 28, 1913 |
| 1,187,861 | Rembold | June 20, 1916 |
| 1,566,814 | Bliss | Dec. 22, 1925 |
| 1,765,059 | De Leeuw | June 17, 1930 |
| 2,361,130 | Simpson | Oct. 24, 1944 |
| 2,402,265 | Thompson | June 18, 1946 |
| 2,533,833 | Mott | Dec. 12, 1950 |

FOREIGN PATENTS

| Number | Country | Date |
|---|---|---|
| 248,809 | Germany | July 2, 1912 |
| 382,574 | Germany | Nov. 9, 1921 |
| 396,858 | Germany | June 12, 1924 |
| 84,804 | Switzerland | Apr. 16, 1920 |